(12) United States Patent
Alary et al.

(10) Patent No.: US 9,816,020 B2
(45) Date of Patent: Nov. 14, 2017

(54) SINTERED SHAPED ABRASIVE GRAINS ON BASIS OF ALUMIUNUM OXIDE COMPRISING MINERALOGICAL PHASES CONSISTING OF MULLITE, TIALITE AND/OR ARMALCOLITE, AND BADDELEYITE AND/OR SRILANKITE AND A METHOD FOR THEIR PRODUCTION

(71) Applicant: Center for Abrasives and Refractories Research and Development C.A.R.R.D. GmbH, Villach-St. Magdalen (AT)

(72) Inventors: Jean-Andre Alary, L'Isle sur la Sorgue (FR); Alexander Hirsch, Villach (AT)

(73) Assignee: Center for Abrasives and Refractories Research and Development C.A.R.R.D. GmbH, Villach-St. Magdalen (AT)

( * ) Notice: Subject to any disclaimer, the term of this patent is extended or adjusted under 35 U.S.C. 154(b) by 0 days.

(21) Appl. No.: 15/015,390

(22) Filed: Feb. 4, 2016

(65) Prior Publication Data

US 2016/0230058 A1    Aug. 11, 2016

(30) Foreign Application Priority Data

Feb. 6, 2015  (DE) .................... 10 2015 101 709
Jan. 6, 2016  (DE) .................... 10 2016 100 196

(51) Int. Cl.
| | | |
|---|---|---|
| *B24D 3/02* | (2006.01) | |
| *C09C 1/68* | (2006.01) | |
| *C09K 3/14* | (2006.01) | |
| *C04B 35/488* | (2006.01) | |
| *C04B 111/00* | (2006.01) | |

(52) U.S. Cl.
CPC ........ *C09K 3/1409* (2013.01); *C04B 35/4885* (2013.01); *C04B 2111/00129* (2013.01); *C04B 2235/3217* (2013.01); *C04B 2235/3232* (2013.01); *C04B 2235/6021* (2013.01)

(58) Field of Classification Search
None
See application file for complete search history.

(56) References Cited

U.S. PATENT DOCUMENTS

| | | |
|---|---|---|
| 2,360,841 A | 10/1944 | Baumann, Jr. et al. |
| 3,387,957 A | 6/1968 | Howard |
| 3,454,385 A | 7/1969 | Amero |
| 3,481,723 A | 12/1969 | Kistler et al. |
| 4,252,544 A | 2/1981 | Takahashi |

FOREIGN PATENT DOCUMENTS

| | | |
|---|---|---|
| EP | 2 636 655 A1 | 9/2013 |
| EP | 2 636 657 A1 | 9/2013 |
| WO | WO 2014/020522 A1 | 2/2014 |

OTHER PUBLICATIONS

Extended European Search Report issued Jun. 3, 2016, in European Application No. 16152780.9 (7 pgs.).

*Primary Examiner* — Kaj K Olsen
*Assistant Examiner* — Ross J Christie
(74) *Attorney, Agent, or Firm* — Finnegan, Henderson, Farabow, Garrett & Dunner LLP

(57) ABSTRACT

The present invention relates to sintered shaped abrasive grains on basis of aluminum oxide. Sintered shaped abrasive grains consistent with the disclosure include mineralogical phases made of mullite, tialite and/or armalcolite, and baddeleyite and/or srilankite. Methods for producing sintered shaped abrasive grains using alumina, ilmenite and zircon sand as raw materials are also provided.

9 Claims, 1 Drawing Sheet

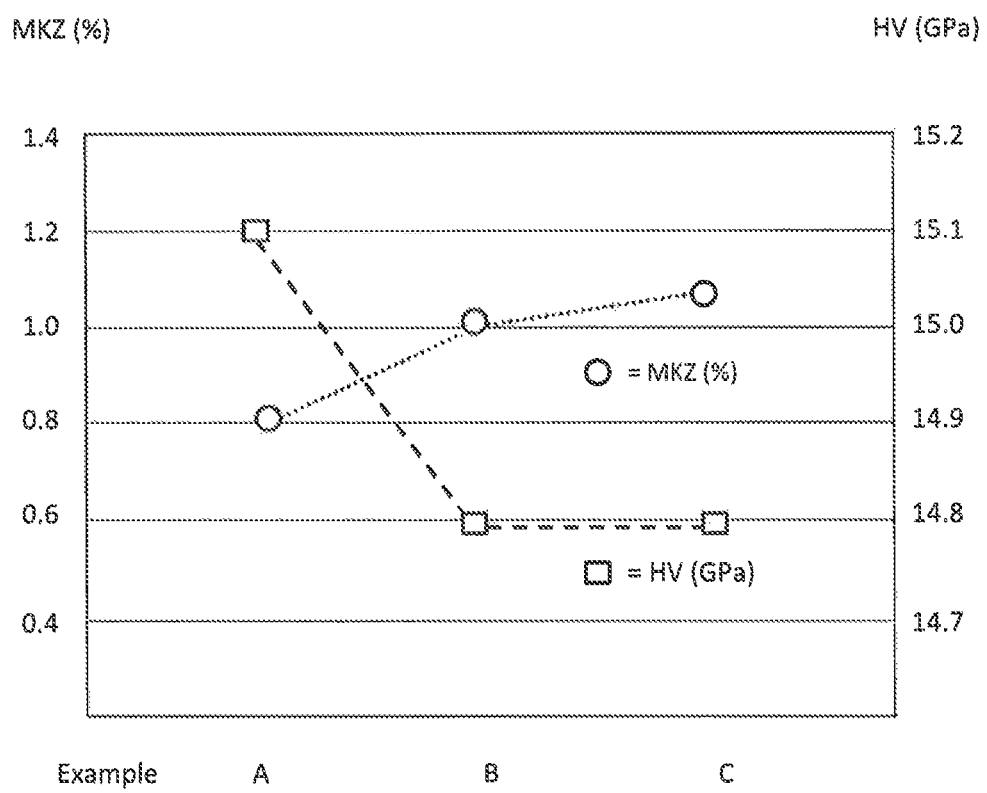

SINTERED SHAPED ABRASIVE GRAINS ON BASIS OF ALUMIUNUM OXIDE COMPRISING MINERALOGICAL PHASES CONSISTING OF MULLITE, TIALITE AND/OR ARMALCOLITE, AND BADDELEYITE AND/OR SRILANKITE AND A METHOD FOR THEIR PRODUCTION

This application is a U.S. non-provisional application, which claims the benefit of priority of German Patent Application Nos. DE 10 2015 101 709.1, filed Feb. 6, 2015, and DE 10 2016 100 196.1, filed Jan. 6, 2016, the subject matter of both of which is incorporated herein by reference.

TECHNICAL FIELD

The present invention relates to sintered shaped abrasive grains on basis of aluminum oxide comprising mineralogical phases consisting of mullite, tialite and/or armalcolite, and baddeleyite and/or srilankite, as well as a method for producing the same, whereby alumina, ilmenite, and zircon sand are used as raw materials. The present invention also relates to the use of such sintered shaped abrasive grains, particularly in bonded abrasives.

BACKGROUND

Because of their high hardness, high fracture toughness, chemical stability, and high temperature resistance, abrasive grains on the basis of aluminum oxide are industrially used in large quantities for the production of abrasive articles. In addition to fused aluminum oxide which is cost-efficiently produced in electric arc furnaces and which, on a quantity basis, represents the largest percentage of abrasive grains for the production of abrasive articles, sintered abrasive grains manufactured by ceramic or chemical processes are often used for special applications. The advantage of sintered abrasive grains for special grinding operations results from their microcrystalline structure and/or their geometrically specified shape.

Generally, the grinding performance of an abrasive grain or an abrasive article is determined by the so called g-ratio which is calculated as the ratio of stock removal to abrasive wear. High hardness of the abrasive grain effects high stock removal rates and consequently a high g-ratio. Simultaneously, high fracture toughness of the abrasive grain yields to low abrasive wear and as well to a high g-ratio. Thus, in the ideal case, hardness and fracture toughness of the abrasive grain should be as high as possible for obtaining a high g-ratio.

However, due to the different physical properties of the plurality of materials which are to be processed, such as, e.g., wood, steel, stainless steel, plastics, stone, ceramics, among others, the abrasive grain has to meet different requirements with regard to its hardness and fracture toughness, respectively, with regard to the ratio of hardness to fracture toughness.

This ratio can be influenced for instance by modifications of the chemical composition. However, the grinding performance of an abrasive grain is not only characterized by its chemical composition, but furthermore by its crystalline structure, its density, and not least by its geometrical shape. Moreover, the decision whether an abrasive grain is used for specific grinding operations is not only influenced by its potential grinding performance, in many cases the grain production costs depending substantially on the raw material costs and the process conditions play an important role.

A sintered rod shaped abrasive grain is described in U.S. Pat. No. 3,387,957, which grain is produced by extruding a mixture of finely grounded bauxite, water and a binder. Such obtained elongated extruded green bodies having a uniform circular cross section are subsequently cut into grains of a definite length, which grains are subsequently sintered at a temperature range between 1300° C. and 1600° C. Such rod shaped sintered abrasive grains are preferably used in resin bonded grinding wheels for heavy duty grinding operations, such as snagging of billets of stainless and high alloy steels.

Due to the raw materials which are used, beside aluminum oxide, the resulting abrasive grains comprise silicon oxide, iron oxide, titanium oxide as well as small amounts of other oxides, such as calcium oxide and magnesium oxide. Some of those oxides form separate mineralogical phases in combination with aluminum oxide, such as mullite ($3 Al_2O_3 * 2 SiO_2$) or tialite ($Al_2TiO_5$), which phases have a lower hardness than aluminum oxide (corundum) effecting that the corresponding abrasive grains are also less hard, however, due to segregations or inclusions of the different phases, the abrasive grains exhibit often a higher fracture toughness which could be advantageous for specific grinding applications. In this case, the possible fields of application of the corresponding abrasive grains are additionally extended, because bauxite is used as low-priced raw material. However, an adverse effect of using natural occurring bauxite is caused by possible variations of the chemical composition which could have a disadvantage effect on the product quality.

A sintered abrasive grain having a density of more than 3.75 g/cm$^3$, a Knoop hardness of more than 1.900 kg/mm$^2$, an aluminum oxide content of more than 98% by weight, and a grain structure configured by a mixture of coarse and fine crystal particles, wherein the coarse crystal have an average particle size in a range of 3 to 10 µm and the small crystal particles have an average particle size of less than 2 µm, is disclosed in U.S. Pat. No. 4,252,544. The abrasive grain is produced by mixing coarse electrofused or high temperature calcined alumina powder having a particle size in the range of 3 to 10 µm and fine powder having particle sizes smaller than 1 µm in the presence of water and a binder; extruding the mixture; drying the extruded material, while cutting it to a determined length; and sintering the cut and dried pieces at a temperature between 1550° C. and 1650° C. Abrasive grains such obtained have a higher hardness compared with abrasive grains on the basis of bauxite, resulting in a high stock removal rate, whereas the wear of the abrasive article simultaneously increases. The increased raw material costs have an adverse effect and make the production more expensive.

U.S. Pat. No. 2,360,841 describes sintered abrasive grains consisting of aluminum oxide crystals containing titanium oxide and iron oxide in solid solution. One embodiment is described comprising additionally zirconium oxide as crystal growth inhibitor.

A sintered abrasive grain useful for heavy duty grinding or snagging operations comprising 30 to 70 percent by weight aluminum oxide, 15 to 60 percent by weight zirconium oxide, and 5 to 15 percent by weight one or more oxides selected from the group consisting of iron oxide, titanium oxide, manganese oxide and silicon oxide, is described in U.S. Pat. No. 3,454,385.

Subject matter of U.S. Pat. No. 3,481,723 are cylindrical abrasive grains consisting essentially of an abrasive material selected from the group consisting of aluminum oxide, zirconium oxide, zirconium silicate, silicon carbide, titanium oxide, manganese oxide, bentonite, silicon and mixtures thereof.

EP 2 636 655 A1 describes abrasive grains on the basis of an alumina sintered compact having a high hardness and a high fracture toughness. For the production of the abrasive grain, alumina powder and ilmenite powder are added to an aqueous medium containing a binder. Subsequently, the mixture is homogenized, shaped to have a desired form, and sintered to obtain sintered shaped abrasive grains having high hardness and excellent fracture toughness. The fracture toughness of the abrasive grains is increased by the formation of $FeTiAlO_5$ crystals in the grain boundary of alumina crystals.

All the above mentioned shaped abrasive grains are used for heavy grinding operations whereby material is to be removed as fast and as much as possible. Snagging or rough grinding of slabs and billets in foundry and steel production industry are examples for such applications, whereby for example highly densified nearly pore free hot pressed resin bonded wheels are used. As mentioned above, the suitability of a compact solid body for the use as abrasive grain substantially depends on its hardness and its fracture toughness. However, also other parameters play a role, e.g. such as bonding forces to hold the abrasive grain in the binding matrix of the grinding wheel and such forces (pressure forces) that are acting on the abrasive grain externally during the grinding process. Considering the wear mechanism of abrasive grains, the abrasive grain firstly wears itself off and blunts until parts of the grain are broken and new cutting edges are formed due to external pressure. In case of very high fracture toughness of the abrasive grain, there is the possibility of a reverse effect in which the whole grain quarries out of the bonding and is therefore lost for the grinding process. Consistently, different materials are treated under different circumstances; therefore, it is necessary to firstly adapt the abrasive grain to the material to be processed as well as to the conditions of grinding and abrasive forces that may occur and to secondly optimize the abrasive grain particularly regarding the interaction between hardness and fracture toughness.

Hence, the task of the present invention is to provide abrasive grains featuring the highest possible hardness and fracture toughness for specific uses. It is another task of this invention to provide a way of producing such optimized abrasive grains in accordance with an acceptable cost/performance ratio.

BRIEF DESCRIPTION OF THE DRAWINGS

FIG. 1 is a chart showing hardness and micro grain decomposition for compositions consistent with the present disclosure.

DETAILED DESCRIPTION

In line with the present works, it was established that a sintered abrasive grain on basis of aluminum oxide, comprising a weight content of $Al_2O_3$ between 85 and 95% by weight, titanium compounds, expressed as $TiO_2$, between 0.5 und 5.0% by weight, silicon compounds, expressed as $SiO_2$, between 0.3 and 4.0% by weight, iron compounds, expressed as $Fe_2O_3$, between 0.4 and 9.0% by weight, zirconium compounds, expressed as $ZrO_2$, between 1.0 und 9.0% by weight and raw-material-based impurities of less than 2% by weight has an optimized hardness and fracture toughness; thereby, an abrasive grain is obtained that offers advantages over prior art in special grinding operations.

For producing sintered abrasive grains, 85%-95% by weight alpha aluminum oxide, 0.5%-8.0% by weight ilmenite and 1.0%-10.0% zircon sand are used as raw materials wherefrom, firstly, a homogeneous dry mixture of the raw materials is prepared. The raw-material-based impurities are less than 2% by weight. Since the crystalline structure of the sintered body ought to be as finely textured as possible, if necessary, the raw materials are previously pulverized. Secondly, at least one binder and at least one solvent are added together with, one or more additive selected from the group comprising dispersants, lubricants and plasticizers for obtaining an extrudable mass. Thirdly, the mass is extruded and prepared to shaped abrasive grain precursors (green bodies) which are subsequently sintered in a temperature range between 1450° C. and 1650° C. Thereby the ratio by weight percent of ilmenite to zircon sand is from 1:6 to 6:1.

After sintering, the mineralogical components of the sintered abrasive grain comprise corundum ($Al_2O_3$), mullite (3 $Al_2O_3*2$ $SiO_2$), tialite and/or armalcolite ($Al_2TiO_5$/AlFeTiO_5$), and baddeleyite and/or srilankite ($ZrO_2$/$Ti_{0.75}Zr_{0.25}O_2$), whereby the ratio by weight percent of mullite to tialite and/or armalcolite is preferably from 6:1 to 1:6.

Preferably and in accordance with the invention, the sintered abrasive grains have a density of ≥3.6 g/cm$^3$ and hardness HV of between 14 und 18 GPa. Moreover, the sintered abrasive grains have a MKZ-value of ≤2.0%, more preferably ≤1.2%.

Advantageously, the sintered abrasive grains are rod shaped bodies having a diameter between 0.5 and 5 mm und a length between 1 and 10 mm, wherein the ratio of diameter to length is between 0.2:1.0 und 1.0:1.0.

To evaluate the quality of abrasive grains, it is essential to carry out grinding tests. Grinding tests are relative extensive and time-intensive. In the abrasive industry, it is thus common to evaluate the quality of abrasive grains in advance by means of mechanical characteristics, which can be accessed more easily and which serve as indications for the later behavior in the grinding test. In the context of the present works, beside the identification of the hardness, the grain toughness of the abrasive grains was determined via the micro grain decomposition (MKZ) by milling in a ball mill.

Micro Grain Decomposition (MKZ)

To measure the micro grain decomposition, 10 g abrasive grains of a definite grit size (e.g. on basis of corundum; preferably grit size 24 or 36) are milled in a ball mill (height 10.5 cm, diameter 6.8 cm) filled with 12 steel balls (diameter 19 mm, weight 330-332 g) at 185 revolutions per minute over a time period of 150 seconds. The milled grain is subsequently screened in a Rotap screening machine (Haver Böcker EHL 200) for 5 minutes via a corresponding fine sieve (preferably 250 μm) which is 2 classes finer than the bottom sieve defined for the corresponding grit size, subsequently, the fine portion is balanced out. The MKZ value follows from:

$$MKZ\ (\%) = \frac{\text{sieve pass-through}}{\text{total weight}} \times 100$$

The micro grain decomposition does not only correlate with the fracture toughness of abrasive grains but is at the same time also an important indicator for the grinding properties of abrasive grains. Thus, relatively reliable predictions of the grinding performance can be made for certain grinding operations on the basis of the MKZ-value, provided that the necessary interaction between hardness and fracture toughness for the corresponding grinding operation is given.

As mentioned earlier, the rod shaped abrasive grains are preferably used for rough grinding or snagging of slabs and billets in foundry and steel production industry whereat highly compressed almost pore-free resin bonded grinding wheels are used. In typical tests, e.g. work pieces made of carbon steel with 220 mm thickness, 400 mm width, and 1540 mm length or work pieces made of stainless steel with 140 mm thickness, 500 mm width, and 2080 mm length are treated with resin bonded grinding wheels at constant machine parameters where the wheel has a cross-section dimension of 616 mm and 76 mm width. In these tests it was generally found that with the use of abrasive grains according to the invention the g-ratio (ratio of material removal to wheel wear) rises with a falling MKZ-value. Consequently, conclusions can be drawn from the MKZ-value to the capability of the abrasive grains. However, this only applies if also the hardness of the abrasive grains lies within the requested range for certain grinding operations, which range amounts with regard to the abrasive grains of the present invention from 14 to 18 GPa hardness HV.

The interaction of hardness and MKZ-value of the abrasive grains may be influenced by the addition of zircon sand or the ratio of zircon sand to ilmenite, respectively. The sintered abrasive grain finally also mirrors this in the ratio of the mineralogical components mullite to tialite and/or armalcolite. With raw materials, the ratio by weight percent of zircon sand to ilmenite should be from 1:6 to 6:1 in order to ensure high performing abrasive grains. However, it was worked out that extraordinary results were achieved with abrasive grains where zircon sand and ilmenite were used at the rate of 5:1 to 1:1. The sintered abrasive grain has the ratio by weight percent of mullite to tialite and/or armalcolite from 6:1 to 1:6.

The following table 1 provides a summary of the chemical compositions, the raw materials used, the physical properties, and the mineralogical phases of some selected rod shaped sintered abrasive grains.

to ilmenite of 3:1 reveals the lowest MKZ-value and has therewith the highest grain fracture strength. May be that thereby the high portions (8%) of mullite phase in the finished product play a role which fact will be subject matter of further investigations. The samples B and C with a ratio of zircon sand to ilmenite of 1:1 and 1:3, respectively, show little bit higher MKZ-values, wherefore a lower grinding performance may be expected.

The ratio of zircon sand to ilmenite of 3:1 was maintained with the examples D and E, whereas the percentage of alumina was increased. It was found that in this case the MKZ-values became worse with increasing alumina content, while example F, with lower alumina content also having a ratio of zircon sand to ilmenite of 3:1 reveals an excellent MKZ-value of 1.0% and a hardness of 16.6 GPa, which fact is another indication for the advantage of the additives ilmenite and zircon sand.

Comparative examples G, H, and I are based on bauxite as raw material, whereby high-quality bauxite was used for comparative example I. The difference between the samples G and H which both are based on different types of bauxite as raw material consists mainly in the different percentages of mullite phases in the product. Also in this case the influence of the mullite phase on the product quality has to be investigated in more detail.

Furthermore, with example J, sintered corundum rods on basis of pure alumina were used for comparison. Comparative example J shows a high hardness of 18.6 GPa and a low MKZ-value of 1.0% and is settled in the same range as the examples B, C and F according to the present invention. Whereas the MKZ-value of example A is significantly better. Preliminary conventional grinding tests have indicated that for the present samples the g-ratio (the ratio of material removal to wheel wear) correlates directly with the MKZ values, so that, with the abrasive grains according to the present invention, products are available which can be produced in a cost-efficient way and which provide, for special grinding operations, equal or even better grinding results compared to the sintered rods based on pure alumina.

FIG. 1 additionally shows those correlations with the example of the samples A, B, and C according to the present

TABLE 1

| example | | A | B | C | D | E | F | G | H | I | J |
|---|---|---|---|---|---|---|---|---|---|---|---|
| chemical composition (wt. %) | $Al_2O_3$ | 90.2 | 90.5 | 90.7 | 95.0 | 97 | 86.6 | 79.4 | 80.1 | 87.5 | 99.7 |
| | $Fe_2O_3$ | 0.86 | 1.6 | 2.3 | 0.4 | 0.3 | 0.95 | 10.8 | 10.7 | 5.50 | 0.03 |
| | $TiO_2$ | 1.5 | 2.9 | 4.3 | 0.8 | 0.5 | 1.9 | 5.2 | 5.60 | 2.60 | — |
| | $ZrO_2$ | 4.9 | 3.2 | 1.6 | 2.5 | 1.6 | 7.0 | 0.14 | 0.11 | 0.13 | — |
| | $SiO_2$ | 2.4 | 1.6 | 0.6 | 1.2 | 0.7 | 3.4 | 4.20 | 3.10 | 4.10 | 0.05 |
| raw materials (Wt. %) | bauxite | — | — | — | — | — | — | 100 | 100 | 100 | — |
| | alumina | 90.0 | 90.0 | 90.0 | 95.0 | 97.0 | 87.0 | — | — | — | 100 |
| | $ZrSiO_4$ | 7.5 | 5.0 | 2.5 | 3.75 | 2.25 | 9.75 | — | — | — | — |
| | ilmenite | 2.5 | 5.0 | 7.5 | 1.25 | 0.75 | 3.25 | — | — | — | — |
| density g/cm³ | | 3.78 | 3.77 | 3.80 | 3.83 | 3.76 | 3.68 | 3.73 | 3.78 | 3.74 | 3.81 |
| hardness $H_V$ (GPa) | | 15.1 | 14.8 | 14.8 | 15.9 | 16.8 | 16.6 | 13.6 | 13.6 | 14.5 | 18.6 |
| MKZ (%) | | 0.80 | 1.00 | 1.05 | 1.35 | 1.40 | 1.00 | 2.50 | 2.75 | 2.40 | 1.00 |
| mineralogical phases (%) | corundum | 81 | 85 | 82 | 88 | 92 | 77 | 59 | 66 | 72 | 100 |
| | mullite | 8 | tr. | tr. | 2 | — | 4 | 10 | 4 | 12 | — |
| | tialite/ armalcolite | 2 | 7 | 12 | — | tr. | 2 | 10 | 11 | 4 | — |
| | baddeleyite | 4 | 3 | 1 | 2 | 1 | 5 | — | — | — | — |
| | srilankite | 1 | 1 | 1 | 1 | 2 | 2 | — | — | — | — |
| | amorphous | 4 | 4 | 4 | 7 | 7 | 10 | 21 | 19 | 12 | — |

With the examples A, B, and C according to the present invention in each case 90% by weight of alumina were used as raw material, whereas the portions of zircon sand and ilmenite are varied. Sample A having a ratio of zircon sand invention graphically. It can be seen that sample A, with the ratio of zircon sand to ilmenite of 3:1, features a relatively high hardness with HV 15.1 GPa and at the same time a very low MKZ-value of 0.8%; consequently, it offers those properties from which a very good grinding performance may be expected. In fact, in preliminary grinding tests, such sintered abrasive grains offered an improved g-ratio of up to 75% compared to sintered rods on bauxite basis (samples G and H). Example B, with the ratio of zircon sand to ilmenite of 1:1, and example C, with the ratio of zircon sand to ilmenite of 1:3, are featuring only little differences in their mechanical properties. However, hardness HV of less than 15 GPa and micro grain decomposition MKZ of approximately 1.0% cause a g-ratio in the range of sintered alumina rods, whereas the productions costs are more favorable because of the low priced raw material basis. To make things even better, the mineralogical phases cause an increased grain fracture strength (lower MKZ) together with an insignificantly decreased hardness, so that the abrasive grains according to the present invention are predestinated for machining special types of very tough steels.

The invention claimed is:

1. A method for producing sintered abrasive grains, comprising the steps:
    preparing a homogeneous dry mixture of 85%-95% by weight alumina ($Al_2O_3$), 1.0%-10% by weight zircon sand ($ZrSiO_4$), and 0.5%-8.0% by weight ilmenite ($FeTiO_3$), whereby raw-material-based impurities are less than 2% by weight;
    adding at least one binder and at least one solvent together with one or more additives selected from the group comprising dispersants, lubricants and plasticizers for obtaining an extrudable mass;
    extruding the mass;
    cutting the extruded product to shaped abrasive grain precursors; and
    sintering the shaped abrasive grain precursors in a temperature range between 1450° C. and 1650° C. to obtain sintered abrasive grains comprising corundum ($Al_2O_3$), mullite ($3Al_2O_3*2SiO_2$), tialite and/or armalcolite ($Al_2TiO_5$/$AlFeTiO_5$) and baddeleyite and/or srilankite ($ZrO_2$/$Ti_{0.75}Zr_{0.25}O_2$), wherein the sintered abrasive grains comprise a weight content of:
    $Al_2O_3$ between 85% and 95% by weight;
    titanium compounds, expressed as $TiO_2$, between 0.5% and 5.0% by weight;
    silicon compounds, expressed as $SiO_2$, between 0.3% and 4.0% by weight;
    iron compounds, expressed as $Fe_2O_3$, between 0.4% and 9.0% by weight;
    zirconium compounds, expressed as $ZrO_2$, between 1.0% und 9.0% by weight; and
    raw-material-based impurities of less than 2% by weight.

2. The method according to claim 1, whereby the ratio by weight percent of zircon sand to ilmenite is from 1:6 to 6:1.

3. Sintered abrasive grains comprising corundum (Al2O3), mullite (3Al2O3*2 SiO2), tialite and/or armalcolite (Al2TiO5/AlFeTiO5) and baddeleyite and/or srilankite (ZrO2/Ti0.75Zr0.25O2), wherein the sintered abrasive grains comprise a weight content of
    $Al_2O_3$ between 85% and 95% by weight;
    titanium compounds, expressed as $TiO_2$, between 0.5% und 5.0% by weight;
    silicon compounds, expressed as $SiO_2$, between 0.3% and 4.0% by weight;
    iron compounds, expressed as $Fe_2O_3$, between 0.4% and 9.0% by weight;
    zirconium compounds, expressed as $ZrO_2$, between 1.0% und 9.0% by weight; and
    raw-material-based impurities of less than 2% by weight.

4. Sintered abrasive grains according to claim 3, whereby the ratio by weight percent of mullite to tialite and/or armalcolite is from 6:1 to 1:6.

5. Sintered abrasive grains according to claim 3 having a density of ≥3.6 g/cm³ and a hardness HV between 14 and 18 GPa.

6. Sintered abrasive grains according to claim 3 having a MKZ-value of ≤2.0%.

7. Sintered abrasive grains according to claim 6 having a MKZ-value of ≤1.2%.

8. Sintered abrasive grains according to claim 3, whereby the sintered abrasive grains are rod shaped bodies having a diameter between 0.5 and 5 mm and a length between 1 and 10 mm, wherein the ratio of diameter to length is between 0.2:1.0 and 1.0:1.0.

9. Sintered abrasive grains according to claim 3, wherein the sintered abrasive grains are manufactured by a method comprising the following steps:
    preparing a homogeneous dry mixture of 85%-95% by weight alumina ($Al_2O_3$), 1.0%-10% by weight zircon sand ($ZrSiO_4$), and 0.5%-8.0% by weight ilmenite ($FeTiO_3$), whereby raw-material-based impurities are less than 2% by weight;
    adding at least one binder and at least one solvent together with one or more additives selected from the group comprising dispersants, lubricants and plasticizers for obtaining an extrudable mass;
    extruding the mass;
    cutting the extruded product to shaped abrasive grain precursors; and
    sintering the shaped abrasive grain precursors in a temperature range between 1450° C. and 1650° C.

* * * * *